US012679981B2

(12) United States Patent
Bui et al.

(10) Patent No.: US 12,679,981 B2
(45) Date of Patent: Jul. 14, 2026

(54) ADHESION PROMOTER COMPOSITIONS TO ELIMINATE SUBSTRATE PREPARATION AND METHODS FOR THE SAME

(71) Applicant: The Boeing Company, Chicago, IL (US)

(72) Inventors: Phuong Bui, Thousand Oaks, CA (US); Stella Fors, Los Angeles, CA (US); Adam F. Gross, Santa Monica, CA (US); Ashley Marie Dustin, Santa Monica, CA (US); Andrew P. Nowak, Malibu, CA (US); Melinda Dae Miller, Snohomish, WA (US); Carissa Ann Pajel, Mercer Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 275 days.

(21) Appl. No.: 17/654,252

(22) Filed: Mar. 10, 2022

(65) Prior Publication Data

US 2022/0306868 A1     Sep. 29, 2022

Related U.S. Application Data

(63) Continuation-in-part of application No. 17/654,246, filed on Mar. 10, 2022.

(60) Provisional application No. 63/166,050, filed on Mar. 25, 2021.

(51) Int. Cl.
| | |
|---|---|
| *C09D 5/00* | (2006.01) |
| *C08G 77/22* | (2006.01) |
| *C09D 7/20* | (2018.01) |
| *C09D 7/63* | (2018.01) |
| *C09D 183/08* | (2006.01) |

(52) U.S. Cl.
CPC ............ *C09D 5/002* (2013.01); *C08G 77/22* (2013.01); *C09D 7/20* (2018.01); *C09D 7/63* (2018.01); *C09D 183/08* (2013.01)

(58) Field of Classification Search
CPC . C09D 5/002; C09D 7/20; C09D 7/63; C09D 183/08; C08G 77/22
See application file for complete search history.

(56) References Cited

U.S. PATENT DOCUMENTS

| | | |
|---|---|---|
| 3,687,882 A | 8/1972 | Bishop |
| 4,000,347 A | 12/1976 | Ranney et al. |
| 4,725,501 A | 2/1988 | Rukavina et al. |
| 4,839,454 A | 6/1989 | Lin et al. |
| 4,849,462 A | 7/1989 | Bishop |

| | | | |
|---|---|---|---|
| 5,459,182 A | 10/1995 | Peeters et al. | |
| 7,510,773 B2 | 3/2009 | Staggs | |
| 8,128,748 B2 | 3/2012 | Sutter et al. | |
| 10,941,256 B2 | 3/2021 | Dustin et al. | |
| 2008/0245271 A1 | 10/2008 | Trabesinger et al. | |
| 2009/0005263 A1* | 1/2009 | Kuck ..................... C12Q 1/682 | |
| | | | 506/9 |
| 2010/0234502 A1 | 9/2010 | Iwasaki | |
| 2011/0104504 A1 | 5/2011 | Dohner et al. | |
| 2015/0024326 A1 | 1/2015 | Nawrocki et al. | |
| 2017/0240780 A1* | 8/2017 | Kramer ................. C07F 7/1804 | |
| 2019/0331649 A1 | 10/2019 | Kandapallil et al. | |
| 2021/0017342 A1 | 1/2021 | Dustin et al. | |
| 2021/0155761 A1 | 5/2021 | Dustin et al. | |
| 2021/0230457 A1 | 7/2021 | Liu et al. | |

FOREIGN PATENT DOCUMENTS

| | | | | |
|---|---|---|---|---|
| CN | 110305621 A | 10/2019 | | |
| EP | 1582571 A1 | 10/2005 | | |
| EP | 3323844 A1 * | 5/2018 | .............. | C08L 83/06 |
| EP | 3766904 A1 | 1/2021 | | |
| WO | WO-2005022257 A2 * | 3/2005 | ........ | C08F 220/1804 |
| WO | WO-2008106379 A1 * | 9/2008 | ............. | C08G 77/18 |
| WO | WO-2020065588 A1 * | 4/2020 | ........... | C09D 181/02 |

OTHER PUBLICATIONS

Extended European Search Report issued Jun. 30, 2022 in related European Application No. 21216938.7, 7 pages.
Baglioni et al., "Organogel Formulations for the Cleaning of Easel Paintings," Applied Physics A (2015) 121:857-868.
Curteis, "An Investigation of the Use of Solvent Gels for the Removal of Wax-Based Coatings from Wall Paintings," Dissertation accepted for a postgraduate diploma in the Conservation of Wall Painting in the Conservation of Wall Painting Department, Courtauld Institute of Art, University of London, Jul. 1991, 154 pages.
Fiore et al., Effect of Silane Coupling Treatment on the Adhesion Between Polyamide and Epoxy Based Composites Reinforced with Carbon Fibers, MDPI Fibers (2020), 8, 48, 14 pages.
Pianorsi et al., "Organogels for the Cleaning of Artifacts," Pure Appl. Chem. (2017) 89(1):3-17.
Scott, "The Use of Agar as a Solvent Gel in Objects Conservation," Conservation of Historic and Artistic Works, AIC Objects Specialty Group Postprints, vol. 19, 2012, 71-83.
Underhill et al., "Corrosion Resistance Imparted to Aluminum by Silane Coupling Agents," Silanes and Other Coupling Agents, 2000, vol. 2, 149-158.

* cited by examiner

*Primary Examiner* — Robert S Walters, Jr.
(74) *Attorney, Agent, or Firm* — MH2 Technology Law Group LLP

(57) ABSTRACT

An adhesion promoter composition is disclosed. The adhesion promoter composition includes a first reactive silane compound and a second reactive silane compound, where the second reactive silane is different from the first. The adhesion promoter composition also includes one or more organic solvents and an organic base. A method for applying the adhesion promoter composition is also disclosed.

20 Claims, No Drawings

ADHESION PROMOTER COMPOSITIONS TO ELIMINATE SUBSTRATE PREPARATION AND METHODS FOR THE SAME

CROSS-REFERENCE TO RELATED APPLICATIONS

This application is a continuation-in-part of U.S. patent application Ser. No. 17/654,246, filed on Mar. 10, 2022, the entirety of which is incorporated by reference herein. Both applications claim priority to U.S. Provisional Patent Application No. 63/166,050, filed on Mar. 25, 2021, the entirety of which is incorporated by reference herein.

TECHNICAL FIELD

The present disclosure generally relates to the field of sealants and coatings. More particularly, the present disclosure relates to compositions for preparing a surface or substrate (e.g., surface of a fuel tank for aerospace vehicle) for subsequent application of polymeric materials, such as epoxy, polyurethane, or polysulfide sealants or coatings.

BACKGROUND

Sealants and surface coatings play a vital role in the successful assembly of various aircraft components and see widespread use in both manufacturing and maintenance. Sealants and coatings are used extensively in fuel tank applications within the aircraft structure as fastener fillets or as gap fillers. For example, commercial aircrafts that store fuel in wings and/or tanks located between the wings do not rely on bladders or liners to contain the fuel. Instead, commercial aircrafts may have metallic or composite fuel tanks as a primary structure to contain the fuel. As a result, joints and bolts must be properly sealed to eliminate fuel leakage, mitigate corrosion potential, and protect against arcing electrical discharge in the fuel storage in the event of a lightning strike.

Conventional application of the sealant at or around the area of the joints and bolts includes cleaning the area with a solvent and subsequent application of an adhesion promoter, or a Class A material (e.g., Class A polysulfide sealant, brushable sealant, etc.). After application of the adhesion promoter, a thixotropic sealant (e.g., a Class B polysulfide sealant) can be applied and allowed to cure to complete the sealing system. The curing of the sealing system is often a lengthy process (e.g., up to 24 hours or more) that slows aircraft production and maintenance efficiencies.

What is needed, then, are improved compositions for preparing a surface for sealants, surface coatings, and more efficient methods for preparing and utilizing the improved compositions.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the present disclosure provide an adhesion promoter composition. The adhesion promoter composition includes a first reactive silane compound and a second reactive silane compound, where the second reactive silane is different from the first. The adhesion promoter composition also includes one or more organic solvents. The adhesion promoter composition also includes an organic base.

Implementations of the present disclosure may include where the adhesion promoter composition includes where the first reactive silane compound may include an epoxy functional group, a mercapto functional group, an amino functional group, an acrylate functional group, an isocyanate functional group, or a combination thereof. The first reactive silane compound may include glycidoxypropyltrimethoxysilane. The second reactive silane compound may include mercaptopropyltrimethoxysilane. The organic base may include pyridine, alkanamine, imidazole, benzimidazole, aniline, quinoline, histidine, guanidine, phosphazene, a hydroxide of an organic cation, or a combination thereof. The organic base may include 1-methylimidazole. The first reactive silane compound is present in an amount of from about 0.1% to about 5.0% by total weight of the adhesion promoter composition, the second reactive silane compound is present in an amount of from about 0.5% to about 20.0% by total weight of the adhesion promoter composition, and the organic base present in an amount of from about 0.1% to about 5.0% by total weight of the adhesion promoter composition. The adhesion promoter composition may include where the first reactive silane compound is present in an amount of from about 0.1% to about 2.0% by total weight of the adhesion promoter composition, the second reactive silane compound is present in an amount of from about 0.1% to about 10.0% by total weight of the adhesion promoter composition, and the organic base present in an amount of from about 0.1% to about 2.0% by total weight of the adhesion promoter composition. In certain implementations of the adhesion promoter composition, the first reactive silane compound may include glycidoxypropyltrimethoxysilane, the second reactive silane compound may include mercaptopropyltrimethoxysilane, the one or more organic solvents may include methyl ethyl ketone (MEK), methyl propyl ketone (MPK), methyl isobutyl ketone (MIBK), acetone, or combinations thereof, and the organic base may include 1-methylimidazole.

Examples of the present disclosure provide another adhesion promoter composition. The adhesion promoter composition includes a first reactive silane compound which may include an epoxy functional group, a mercapto functional group, an amino functional group, an acrylate functional group, an isocyanate functional group, or a combination thereof. The adhesion promoter composition also includes a second reactive silane compound which may include an epoxy functional group, a mercapto functional group, an amino functional group, an acrylate functional group, an isocyanate functional group, or a combination thereof, and where the second reactive silane is different from the first. The adhesion promoter composition also includes one or more organic solvents. The adhesion promoter composition also includes an organic base.

Implementations of the adhesion promoter composition may include where the first reactive silane compound includes glycidoxypropyltrimethoxysilane and is present in an amount of from about 0.1% to about 5.0% by total weight of the adhesion promoter composition. The second reactive silane compound may include mercaptopropyltrimethoxysilane and is present in an amount of from about 0.5% to about 20.0% by total weight of the adhesion promoter composition. Examples of the adhesion promoter composition may include where the first reactive silane compound includes glycidoxypropyltrimethoxysilane, the second reactive silane compound includes mercaptopropyltrimethoxysilane, the one or more organic solvents may include methyl ethyl ketone (MEK), methyl propyl ketone (MPK), methyl isobutyl ketone (MIBK), acetone, or combinations thereof, and the organic base may include 1-methylimidazole.

A method for applying an adhesion promoter composition is also disclosed. The method for applying an adhesion promoter composition includes contacting a first reactive silane compound which may include glycidoxypropyltrimethoxysilane, a second reactive silane compound which may include mercaptopropyltrimethoxysilane, and one or more organic solvents which may include methyl ethyl ketone (MEK), methyl propyl ketone (MPK), methyl isobutyl ketone (MIBK), acetone, or combinations thereof, to prepare a first part of the adhesion promoter composition. The method for applying an adhesion promoter composition also includes contacting an organic base with the first part of the adhesion promoter composition. The method for applying an adhesion promoter composition also includes combining the first part of the adhesion promoter composition with the organic base. The method for applying an adhesion promoter composition also includes applying the adhesion promoter composition to a substrate and applying a polymer formulation layer over the adhesion promoter composition.

The method for applying an adhesion promoter composition may include pausing after applying the adhesion promoter composition to the substrate to allow the adhesion promoter time to react with the substrate, the organic solvents to evaporate from the adhesion promoter composition, or a combination thereof. The substrate may be a carbon fiber composite substrate. The polymer formulation layer may include an epoxy-based polymer formulation, a polyurethane-based polymer formulation, a polysulfide-based polymer formulation, or a combination thereof. The method may include no mechanical processing of the substrate. A shelf life of the adhesion promoter prior to combining the first part of the adhesion promoter composition with the organic base is from about 1 day to about 730 days when stored at or below a temperature of 25° C. A shelf life of the adhesion promoter after combining the first part of the adhesion promoter composition with the organic base is from about 0.5 days to about 14 days when stored at or below a temperature of 25° C.

The features, functions, and advantages that have been discussed can be achieved independently in various implementations or can be combined in yet other implementations further details of which can be seen with reference to the following description.

DETAILED DESCRIPTION

During the assembly of various aircraft components, sealants, coatings, and finishes play an integral role in terms of component manufacturing and maintenance. Sealants and polymer-based coatings are extensively used in fuel tank and other critical components to prevent leaks, corrosion, and electromagnetic effects, such as lightning strikes. Current processes for applying polysulfide and other sealants or coatings to aircraft components is time consuming and slows down efficient aircraft production and maintenance. An exemplary process involving a fastener fillet sealing includes, abrasion of a substrate panel, brush application of a low viscosity Class A polysulfide sealant onto a surface or substrate. After this first Class A sealant is applied, a thixotropic Class B polysulfide sealant is applied over the top of the Class A polysulfide sealant and allowed to cure.

Adhesion promoter compositions as described herein can improve the adhesion between surfaces, in particular bonding between polymeric materials such as paints, coatings, and sealants onto aircraft or aerospace substrates such as aluminum and/or carbon fiber reinforced composites without additional mechanical surface preparation. Surface treatments including physical methods such as flame, plasma, or corona discharge, mechanical treatments including sanding, abrading, and harsh chemical treatments including acid etching can be eliminated as well. These adhesion promoter compositions can be compositions of a first reactive silane coupling agent and a second reactive silane coupling agent dispersed in organic solvents (MEK, MIBK, etc.), where the first reactive silane coupling agent and the second reactive silane coupling agent are different. The first reactive silane compound and the second reactive silane group each include an epoxy functional group, a mercapto functional group, an amino functional group, an acrylate functional group, an isocyanate functional group, or a combination thereof. The adhesion promoter compositions include an organic base, for example, 1-methylimidazole. The use of an adhesion promoter in place of the Class A sealant or other primer may eliminate the need for additional materials and curing time for multiple layers of sealant or coating composition. Furthermore, little or no surface preparation is required with the use of such adhesion promoters, and the material is effective on a variety of surfaces such as aluminum, titanium, carbon fiber reinforced composites, and others. Additional benefits with the use of adhesion promoter compositions as provided herein include a multipurpose adhesion promoter composition designed for improving the adhesion between surfaces and epoxy, polyurethane, and/or polysulfide coatings. These include bonding polymeric materials or polymer layer formulations such as paints and sealants on aerospace substrates such as aluminum and/or carbon fiber reinforced polymers (CFRP) without mechanical surface preparation. These adhesion promoter compositions may optionally contain organometallic species based on aluminum, titanium or zirconium, a mixture of epoxy-functional and thiol-functional silane coupling agents, and an organic base dispersed in organic solvents. The composition can be applied as a low viscosity solution, by spraying, flowing, or wiping onto a substrate, or may alternatively be incorporated into a gelled solvent for greater application convenience. The performance of these adhesion promoter compositions and systems allows them to cure using multiple mechanisms, such as base initiated epoxy activation leading to thiol-initiated epoxy ring opening, utilizing a typical silane reaction, thus eliminating the need for more lengthy steps, including but not limited to surface preparation such as sanding, abrading, and the like. The adhesion promoter compositions of the present disclosure further provide improved shelf life stability and applicability to a wider variety of sealants, primers, polymer formulation layers, paints, or surface coatings as compared to previously available preparations.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

All references cited herein are hereby incorporated by reference in their entireties. In the event of a conflict in a definition in the present disclosure and that of a cited reference, the present disclosure controls.

The present disclosure provides one or more adhesion promoter compositions. As used herein, the term "adhesion promoter" refers to a class of materials composed of a liquid reactive silane or reactive organometallic composition within an organic solvent. The adhesion promoter compositions disclosed herein include one or more optional functional additives or agents capable of or configured to improve upon conventional methods of preparing a surface for treatment or application of a sealant. For example, as further described herein, the adhesion promoter compositions disclosed herein can be capable of or configured to concurrently or simultaneously clean a surface and treat the surface with the adhesion promoter solution, thereby effectively eliminating the step of separately cleaning the surface with an organic solvent, as well as any other substrate preparation steps. Accordingly, the adhesion promoter composition disclosed herein provides methods for reducing the amount of time necessary to seal a surface with a sealant, as compared to conventional methods, thereby reducing manufacturing cycle times for the product being manufactured (e.g., aircrafts), which leads to a significant cost savings. The adhesion promoter compositions disclosed herein are also capable of or configured to provide or facilitate the identification of an area or surface treated with the adhesion promoter composition (e.g., via an indicator).

As used herein, surface coatings for various substrates may also refer to sealants, polymer layers, polymer-based layers, coatings, paints, or polymer formulation layers. These polymer formulation layers may include polysulfide systems, epoxy-based polymer systems, polyurethane-based polymer systems, combinations thereof, and the like.

Compositions disclosed herein can be or include an adhesion promoter composition including one or more organic solvents, one or more reactive silanes, one or more organic bases, one or more organometallics, one or more optional gelling agents, one or more optional functional additives, or combinations thereof. The adhesion promoter composition can be capable of or configured to prepare a surface for subsequent treatment or application of a sealant (e.g., polysulfide sealant) or other surface polymer formulation layer. For example, the adhesion promoter composition can be capable of or configured to clean the surface and/or prime a surface for subsequent treatment or application of a sealant or coating. For example, the adhesion promoter composition can be capable of or configured to clean the surface and/or prime a surface for subsequent treatment or application of polymeric materials, including, but not limited to a polysulfide sealant. The adhesion promoter composition can be capable of or configured to clean one or more of lubricants, such as drilling lubricants, coolants, greases, waxes, or the like, or any combination thereof, from surfaces to be treated. Accordingly, the adhesion promoter compositions disclosed herein can be referred to as multifunctional adhesion promoter compositions. The adhesion promoter compositions for sealants and finishes as described herein may exhibit reaction with various substrates and sealants via multiple mechanisms, such as manganese-cured polysulfides, polythioether epoxy-cured sealants, epoxy-based primers, interlayers between primer layers, interlayers between paint coats, and the like. For example, some reactive organometallic preparations may react more rapidly than reactive silanes under various conditions and/or environments which may eliminate the necessity for lengthy processing steps related to the application of finishes or sealants, including but not limited to surface preparation steps such as sanding, abrading, and the like. In certain examples of adhesion promoter compositions for sealants and finishes as described herein, organometallic compounds may be omitted from the composition to provide adhesion promoter compositions having improved stability, longer working times, improved shelf life, or a combination thereof.

The adhesion promoter composition may be applied to a substrate or surface and provided reaction time to react either with atmospheric moisture during application, resident functional group chemistry of the substrate or surface to improve chemical adhesion between the substrate and a subsequently applied sealant. The adhesion promoter composition can have a reaction time of from about 10 seconds (sec) to about 2 hours (hrs), at a temperature of about 25° C. In certain examples, at a range of from about 20° C. to about 40° C., the reaction time can be extended. For example, the adhesion promoter composition can have a reaction time of from about 10 sec, about 60 sec, about 5 min, about 10 min, about 30 min, about 45 min, or about 60 min to about 65 min, about 70 min, about 90 min, about 100 min, or about 120 min, at a temperature of about 25° C. It should be appreciated that the reaction time may be present during fabrication or preparation of the adhesion promoter composition.

The adhesion promoter composition can exclude, be free, or substantially free of agar and/or agar gels. For example, the adhesion promoter composition can exclude, be free, or substantially free of agar as a solvent gel, such as in agar-based gels. The adhesion promoter composition can exclude, be free, or substantially free of organic or polymeric gelling agents in certain embodiments.

The one or more reactive silanes, also referred to as silane adhesion promoters or silane coupling agents, of the adhesion promoter composition can be capable of or configured to facilitate adhesion of a sealant applied to a surface after treatment with the adhesion promoter composition. For example, the adhesion promoter can be capable of or configured to promote compatibility and/or adhesion between two different sealant layers or between a sealant layer and a substrate, or combinations thereof.

The one or more adhesion promoters can be or include, but are not limited to, one or more compounds including at least one reactive silane, or organometallics including reactive titanate, reactive zirconate, reactive aluminates, or the like, or any combination thereof. As further described herein, the one or more adhesion promoters can also be or include, but are not limited to one or more sealants. Organosilanes are generally understood to be, but not necessarily limited to, multifunctional silicon-containing molecules that include a reactive functional group and one or more hydrolysable alkoxy group. Illustrative silanes can include, but are not limited to, bis(trimethoxysilylethyl)

benzene, bis(triethoxysilylethyl)benzene, 3-acryloxypropy-ltrimethoxysilane, 3-methacryloxypropyltrimethoxysilane, aminopropyltrimethoxysilane, vinyl trimethoxysilane, allyl trimethoxysilane, or combinations thereof. Illustrative gly-cidoxy functional or epoxy functional silanes may include, but are not limited to, glycidoxypropyltrialkoxysilane (such as glycidoxypropyltrimethoxysilanes, 3-glycidoxypropylt-rimethoxysilane, 3-glycidoxypropyltriethoxysilane, and the like), 3-(2,3-epoxypropoxypropyl)methyldiethoxysilane, 2-(3,4-epoxycyclohexyl)ethyltrimethoxysilane, 3-(2,3-ep-oxypropoxypropyl)methyldimethoxysilane, 2-(3,4-epoxy-cyclohexyl)ethylmethyldimethoxysilane, 8-glycidoxyoctylt-rimethoxysilane, 1-(3-glycidoxypropyl)-1,1,3,3,3-pentaethoxy-1,3-disilapropane, and combinations thereof. Illustrative mercapto functional silanes may include, but are not limited to, 3-mercaptopropyltriethoxysilane, 3-mercap-topropyltrimethoxysilane, 11-mercaptoundecyltrimethox-ysilane, s-(octanoyl)mercaptopropyltriethoxysilane, (mer-captomethyl)methyldiethoxysilane, 3-mercaptopropylmethyldimethoxysilane, mercaptopropyl-trialkoxysilanes (such as mercaptopropyltrimethoxysilanes 3-Mercaptopropyltrimethoxysilane), mercaptoundecylt-rimethoxysilane, (mercaptomethyl)methyldiethoxysilane, and combinations thereof. In exemplary examples of adhe-sion promoter compositions, where more than one reactive silane is included in the composition, it can be advantageous for a first reactive silane to be different than a second reactive silane, such that additional organic functionality can be added to the adhesion promoter composition, thus pro-viding additional potential reactive functional groups pres-ent in the adhesion promoter composition. Without being bound by any particular theory, additional functional group chemistry within the adhesion promoter composition may provide versatility or utility for the adhesion promoter composition to be used in numerous applications with respect to polymer formulation layers, substrates, or a com-bination thereof.

The adhesion promoter composition can include one or more organic bases. Illustrative organic bases of the adhe-sion promoter composition can be or include, but are not limited to, organic base including pyridine, alkanamine, imidazole, benzimidazole, aniline, quinoline, histidine, gua-nidine, phosphazene, a hydroxide of an organic cation, 1-methylimidazole, or combinations thereof. Illustrative organic bases of the adhesion promoter composition can also include, but are not limited to those organic bases capable of catalyzing or initiating a reaction between one or more reactive silanes within an adhesion promoter composition, or a reaction between an ingredient of the adhesion promoter composition and a substrate or polymer formulation layer, such as a sealant, coating, and the like.

The one or more organic bases can be present in an amount of from about 0.01 weight % to about 10 weight %, based on a total weight of the adhesion promoter composi-tion. For example, the one or more organic bases can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more organic bases can be present in an amount of from about 0.1 weight % to about 10 weight %, about 2 weight % to about 8 weight %, or about 4 weight % to about 6 weight %.

Organometallics included in the adhesion promoter com-position may include reactive titanate, reactive zirconate, reactive aluminates, or the like, or any combination thereof. Organometallic compounds are generally understood to be any member of a class of compounds containing at least one metal-to-carbon bond in which the carbon is part of an organic group. Organometallic compounds of the present disclosure may further include metal centers including met-als such as, but not limited to, manganese (Mn), lithium (Li), magnesium (Mg), aluminum (Al), zinc (Zn), and iron (Fe). The metal centers may have, but are not limited to, from four to six organic ligands or reactive groups in the organome-tallic composition. The organometallics may have, but are not limited to, reactive groups or organic ligands including amines, vinyl groups, allyl ether groups, acrylic groups, or combinations thereof. The organometallics may have, but are not limited to, non-reactive groups including alkyl, alkoxy, fluoro, phosphates, or combinations thereof. The reactive titanates can, but are not required to, include at least one UV curable functional group, such as an acrylate functional group. The UV curable functional group allows the titanate adhesion promoter to cure or facilitate curing via exposure to UV. The titanate adhesion promoter can include an ethylenically unsaturated titanate containing compound, a neoalkoxy titanate containing compound, or combinations thereof. Illustrative titanate adhesion promoters can include, but are not limited to, tetra (2, 2 diallyoxymethyl)butyl, di(ditridecyl)phosphito titanate, commercially available as KR 55, from Kenrich Petrochemicals, Inc. (hereinafter "Kenrich") of Bayonne, NJ; neopentyl(diallyl)oxy, trineode-canonyl titanatem, commercially available as LICA 01 from Kenrich; neopentyl(diallyl)oxy, tri(dodecyl)benzene-sulfony titanate, commercially available as LICA 09 from Kenrich; neopentyl(diallyl)oxy, tri(dioctyl)phosphato titan-ate, commercially available as LICA 12 from Kenrich; neopentyl(dially)oxy, tri(dioctyl)pyro-phosphato titanate, commercially available as LICA38 from Kenrich; neopentyl (diallyl)oxy, tri(N-ethylenediamino)ethyl titanate, commer-cially available as LICA 44 from Kenrich; neopentyl(diallyl) oxy, tri(m-amino)phenyl titanate, commercially available as LICA 97 from Kenrich; neopentyl(diallyl)oxy, trihydroxy caproyl titanate, commercially available as LICA 99 from Kenrich; or the like, or combinations thereof.

The reactive zirconates can, but are not required to, include at least one UV curable functional group, such as a methylacrylate or an acrylate functional group. The zircon-ate adhesion promoters can include an ethylenically unsatu-rated zirconium containing compound, a neoalkoxy zircon-ate containing compound, or combinations thereof. Illustrative zirconate adhesion promoters can be or include, but are not limited to, tetra(2,2-diallyloxymnethyl)butyl, di(ditridecyl)phosphito zirconate, commercially available as KZ 55 from Kenrich; neopentyl(diallyl)oxy, trineodecanoyl zirconate, commercially available as NZ 01 from Kenrich; neopentyl(diallyl)oxy, tri(dodecyl)benzene-sulfony zircon-ate, commercially available as NZ 09 from Kenrich; neo-pentyl(diallyl)oxy, tri(dioctyl)phosphato zirconate, commer-cially available as NZ 12 from Kenrich; neopentyl(diallyl) oxy, tri(dioctyl)pyro-phosphato zirconate, commercially available as NZ 38 from Kenrich; neopentyl(diallyl)oxy, tri(N-ethylenediamino)ethyl zirconate, commercially avail-able as NZ 44 from Kenrich; neopentyl(diallyl)oxy, tri(m-amino)phenyl zirconate, commercially available as NZ 97 from Kenrich; neopentyl(diallyl)oxy, trimethacryl zirconate, commercially available as NZ 33 from Kenrich; neopentyl (diallyl)oxy, triacryl zirconate, commercially available as NZ 39 from Kenrich; dineopentyl(diallyl)oxy, diparamino benzoyl zirconate, commercially available as NZ 37 from Kenrich; dineopentyl(aiallyl)oxy, di(3-mercapto) propionic zirconate, commercially available as NZ 66A from Kenrich; or combinations thereof. It can be advantageous, in exemplary examples, to formulate an adhesion promoter composition without the use of organometallic compounds. Organometallic compounds, in certain aspects, may cause premature or reduced reaction of ingredients within an adhesion promoter composition as described herein, and therefore can be omitted from the composition to provide adhesion promoter compositions having improved stability, longer working times, improved shelf life, or a combination thereof.

As discussed above, the one or more adhesion promoters can also be or include, but are not limited to, one or more sealants or polymer formulations, such as sealants conventionally used to clean any surfaces, such as a surface of a fillet seal or a fuel tank, or the like. As used herein, the term or expression "sealant" can refer to compositions that can have the ability to resist atmospheric conditions such as moisture and temperature and at least partially block transmission of materials such as water, fuel, and other liquids and gases. It should be appreciated that sealants can have adhesive properties. It should further be appreciated that the sealants can be generally identified by "Class," as determined by their viscosity. The adhesion promoter composition can be combined with Class A sealants, Class B sealants, Class C sealants, or any combination thereof. Class A sealants can generally have a viscosity of from about 100 poise to about 400 poise, and can generally be suitable for application by brushing, injecting, or spraying. Class A sealants can have an application time of about 0.5 hours to about 2 hours. Class B sealants can generally have a viscosity of from about 6000 to about 18000 poise, and can generally be suitable for application by extrusion gun or spatula. Class B sealants can have an application time of about 0.5 hours to about 2 hours. Class C sealants can generally have a viscosity between that of a Class A sealant and a Class B sealant. For example, Class C sealants can generally have a viscosity of from about 1000 to about 4000 poise and can generally be suitable for faying surface or shim sealing, brush coating, or wet installation. Class C sealants can have an application time of about 2 hours to about 336 hours. Viscosity of the Class A, Class B, and Class C sealants can be measured by a cone and plate rheometer (ASTM D4287) or Brookfield viscometer (ASTM D2196). In an exemplary implementation, the one or more adhesion promoters includes a Class A sealant.

Illustrative sealant adhesion promoters can be or include, but are not limited to, one or more silanes, one or more titanates, one or more zirconates, or the like, or combinations thereof.

The one or more adhesion promoters can be present in an amount of from about 0.01 weight % to about 15 weight %, based on a total weight of the adhesion promoter composition. For example, the one or more adhesion promoters can be present in an amount of from about 0.01 weight %, about 0.5 weight %, about 1 weight %, about 1.5 weight %, about 2 weight %, or about 2.5 weight % to about 2.75 weight %, about 3 weight %, about 3.5 weight %, about 4 weight %, about 4.5 weight %, or about 10.0 weight %, based on a total weight of the adhesion promoter composition. In another example, the one or more adhesion promoters can be present in an amount of from about 0.01 weight % to about 10.0 weight %, about 1 weight % to about 8.0 weight %, about 2.0 weight % to about 6.0 weight %, or about 5 weight %, based on a total weight of the adhesion promoter composition.

The one or more organic solvents of the adhesion promoter composition can be capable of or configured to disperse, solubilize, solvate, or otherwise dissolve one or more substances or components of the adhesion promoter composition. The one or more organic solvents of the adhesion promoter composition can also be capable of or configured to disperse, solubilize, solvate, or otherwise dissolve one or more substances, such as greases, oils, or debris, on surfaces contacted with the adhesion promoter composition. For example, the one or more organic solvents of the adhesion promoter composition can be capable of or configured to dissolve the one or more reactive silanes, the one or more reactive organometallics, the one or more optional gelling agents, the one or more functional additives, or combinations thereof. The one or more organic solvents can also be capable of or configured to prepare a surface for subsequent treatment or application of a sealant. For example, the one or more organic solvents can be capable of or configured to at least partially provide a cleaning treatment of a surface that is to be treated with a sealant, such as a polysulfide sealant. It should be appreciated that any organic solvent capable of or configured to dissolve one or more components of the adhesion promoter composition and/or prepare the surface for subsequent treatment or application of a sealant can be utilized.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Illustrative aliphatic hydrocarbon that can be utilized as the one or more organic solvents can be or include, but are not limited to, n-pentane, n-hexane, n-octane, n-nonane, n-decane, or homologues thereof, 2,2,4-trimethyl pentane, or the like, or any combination thereof.

Illustrative aromatic compounds that can be utilized as the one or more organic solvents can be or include, but are not limited to, cyclohexane, benzene, toluene, ethylbenzene, xylene, tetralin, hexafluoro xylene, or the like, or any combination thereof.

Illustrative halogenated hydrocarbons that can be utilized as the one or more organic solvents can be or include, but are not limited to, chloroform, trichloro ethylene, dichloromethane, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative alcohols that can be utilized as the one or more organic solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative aldehydes that can be utilized as the one or more organic solvents can be or include, but are not limited to, furfuraldehyde, or the like.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of per-fluoropolyethers, such as the GALDEN® line, which is commercially available from Solvay of Houston, TX, or the like, or combinations thereof.

Certain embodiments of adhesion promoter compositions as described herein may have very different viscosities which may be tailored according to their method of application. The amount of the one or more organic solvents present in the adhesion promoter composition can vary widely, or may include an optional gelling agent, both of which may directly influence the viscosity of an adhesion promoter composition. For example, a low viscosity composition may not include an optional gelling agent and may have a greater solvent composition. The low viscosity solvent compositions can be applied to a surface or between two substrates by way of brushing, airbrush spraying, spray gun, dropping, pouring, pipetting, wiping, and the like. The amount of the one or more organic solvents present can be at least partially determined by a target or desired viscosity of the adhesion promoter composition. The amount of the one or more organic solvents present in the adhesion promoter composition can be from about 75 weight % to about 99.5 weight %, based on a total weight of the adhesion promoter composition. For example, the amount of the one or more organic solvents present in a lower viscosity adhesion promoter composition can be from about 75 weight %, about 80 weight %, about 85 weight % or about 90 weight % to about 95 weight %, about 98 weight %, about 99 weight %, or about 99.5 weight %, based on a total weight of the adhesion promoter composition. In another example, the amount of the one or more organic solvents present in the adhesion promoter composition may be from about 75 weight % to about 99.5 weight %, about 80 weight % to about 99 weight %, about 85 weight % to about 95 weight %, or about 85 weight % to about 90 weight %, based on a total weight of the adhesion promoter composition.

The adhesion promoter composition having a lower viscosity can have a shear viscosity of from about 0.01 Pa·s to about 10 Pa·s, at a temperature of about 25° C. For example, the adhesion promoter composition can have a shear viscosity of from about 0.01 Pa·s, about 2 Pa·s, about 4 Pa·s, or about 5 Pa·s to about 6 Pa·s, about 8 Pa·s, about 9 Pa·s, or about 10 Pa·s at a temperature of about 25° C. In another example, the adhesion promoter composition can have a shear viscosity of from about 0.01 Pa·s to about 10 Pa·s, about 2 Pa·s to about 8 Pa·s, or about 4 Pa·s to about 6 Pa·s, at a temperature of about 25° C. The measurement of the adhesion promoter composition may be conducted at a shear rate of about 0.1 Hz to about 100 Hz, at a temperature of about 25° C. The adhesion promoter composition can have a viscosity of about 0.01 to about 10 Pa·s at a shear rate of about 0.1 to about 100 sec$^{-1}$.

Certain embodiments of adhesion promoter compositions having a higher viscosity composition can include an optional gelling agent and may have a lower solvent composition as compared to a low viscosity adhesion promoter composition. The high viscosity solvent compositions can be applied to a surface or between two substrates by way of via an extrusion gun, syringe, brushing, rolling, spreading, wiping, and the like, and be suitable for application to overhead or vertical surfaces without running or sagging. The amount of the one or more organic solvents present can be at least partially determined by a target or desired viscosity of the higher viscosity adhesion promoter composition. The amount of the one or more organic solvents present in the adhesion promoter composition can be from about 25 weight % to about 95 weight %, based on a total weight of the adhesion promoter composition. For example, the amount of the one or more organic solvents present in the adhesion promoter composition can be from about 25 weight %, about 30 weight %, about 40 weight % or about 50 weight % to about 60 weight %, about 65 weight %, about 70 weight %, or about 75 weight %, based on a total weight of the adhesion promoter composition. In another example, the amount of the one or more organic solvents present in the adhesion promoter composition may be from about 45 weight % to about 85 weight %, about 45 weight % to about 50 weight %, about 55 weight % to about 65 weight %, or about 80 weight % to about 95 weight %, based on a total weight of the adhesion promoter composition.

The adhesion promoter composition having a higher viscosity can have a shear viscosity of from about 0.1 Pa·s to about 100 Pa·s, or from about 1.0 Pa·s to about 20 Pa·s, at a temperature of about 25° C. For example, the adhesion promoter composition can have a shear viscosity of from about 2.5 Pa·s, about 5 Pa·s, about 7.5 Pa·s, or about 10 Pa·s to about 15 Pa·s, about 20 Pa·s, about 30 Pa·s, or about 40 Pa·s at a temperature of about 25° C. In another example, the adhesion promoter composition can have a shear viscosity of from about 2.5 Pa·s to about 40 Pa·s, about 5 Pa·s to about 25 Pa·s, or about 10 Pa·s to about 20 Pa·s, at a temperature of about 25° C. The measurement of the adhesion promoter composition may be conducted at a shear rate of about 0.1 Hz to about 100 Hz, at a temperature of about 25° C. The adhesion promoter composition can have a viscosity of about 2.5 Pa·s to about 40 Pa·s measured at a shear rate of about 0.1 to about 100 sec$^{-1}$. The one or more gelling agents, which may be, but are not necessarily limited to acrylates, of the adhesion promoter composition can be capable of or configured to form a network with one another. For example, the one or more acrylates can be capable of or configured to interact (e.g., bond) with one another to form an acrylate based network, such as a cross-linked acrylate based network. In another example, the one or more acrylates can be capable of or configured to polymerize into a cross-linked network or mesh that can swell with the solvent to provide a spreadable adhesion promoter composition. The one or more acrylates can be or include one or more monomers and/or one or more oligomers. The one or more acrylates can be or include acrylate monomers having a functionality of two or greater.

Illustrative acrylates can be or include, but are not limited to, one or more acrylates, methacrylates, diacrylates, tria-crylates, polyacrylates, or the like, or combinations thereof. The one or more acrylates can also be or include, but are not limited to, Tetrahydrofurfuryl Methacrylate; Isodecyl Meth-acrylate; 2(2-Ethoxyethoxy) Ethylacrylate; Stearyl Acrylate; Tetrahydrofuryl Acrylate; Lauryl Methacrylate; Stearyl Methacrylate; Lauryl Acrylate; 2-Phenoxyethyl Acrylate; 2-Phenoxyethyl Methacrylate; Glycidyl Methacrylate; Iso-decyl Acrylate; Isobomyl Methacrylate; Isooctyl Acrylate; Tridecyl Acrylate; Tridecyl Methacrylate; Caprolactone Acrylate; Ethoxylated Nonyl Phenol Acrylate; Isobomyl Acrylate; Propoxylated Allyl Methacrylate; Methoxy Poly-ethylene Glycol Monomethacrylate; Polypropylene Glycol Monomethacrylate; Ethoxylated Nonyl Phenol Methacry-late; BetaCarboxyethyl Acrylate; Beta-Carboxyethyl Meth-acrylate; Octyl Acrylate; Decyl Acrylate; Octyl Methacry-late; Decyl Methacrylate; Ethoxylated Alkylphenol Acrylate; Ethoxylated Alkylphenol Methacrylate; Ebecryl™ 111, an Epoxy Monoacrylate commercially available from by UCB Chemicals of Brussells, Belgium; Ebecryl™ CL1039 a urethane Monoacrylate commercially available from UCB Chemicals; Hexadecyl Acrylate; Hexadecyl Methacrylate; Behenyl Acrylate; Behenyl Methacrylate; Nonyl Phenol Propoxylate Monoacrylate, Nonyl Phenol Propoxylate Monomethacrylate; Polyethylene Glycol Dimethacrylate; Polyethylene Glycol Diacrylate; Tetraethylene Glycol Diacrylate; Triethylene Glycol Diacrylate; Tripropylene Glycol Diacrylate; 1,3 Butylene Glycol Dimethacrylate; Ethoxylated Bisphenol A Dimethacrylate; Ethoxylated Bisphenol A Diacrylate; Cyclohexane Dimethanol Diacrylate; Cyclohexane Dimethanol Dimethacrylate; Polypropylene Glycol Diacrylate; Polypropylene Glycol Dimethacrylate; Polyethylene Glycol Diacrylate; Polyethylene Glycol Dimethacrylate; 1,6 Hexane Diol Diacrylate; 1,6 Hexane Diol Dimethacrylate; Propoxylated Neopentyl Glycol Diacrylate; Propoxylated Neopentyl Glycol Dimethacrylate; Ethoxylated Neopentyl Glycol Diacrylate; Ethoxylated Neopentyl Glycol Dimethacrylate; SR 9209, Alkoxylated Aliphatic Diacrylate commercially available from Sartomer of Exton, PA; Dipropylene Glycol Diacrylate; Dipropylene Glycol Dimethacrylate; Tripropylene Glycol Dimethacrylate; Ebecryl™ 150, a Bisphenol A derivative diacrylate commercially available from UCB Chemicals; Trimethylolpropane Trimethacrylate; Trimethylolpropane Triacrylate; Tris (2-Hydroxy Ethyl) Isocyanurate Triacrylate; Tris (2-Hydroxy Ethyl) Isocyanurate Trimethacrylate; Ethoxylated Trimethylolpropane Triacrylate; Propoxylated Trimethylolpropane Triacrylate; Ethoxylated Trimethylolpropane Trimethacrylate; Propoxylated Trimethylolpropane Trimethacrylate; Pentaerythritol Triacrylate; Pentaerythritol Trimethacrylate; Propoxylated Glyceryl Triacrylate; Propoxylated Glyceryl Trimethacrylate; Ethoxylated Glyceryl Triacrylate; Ethoxylated Glyceryl Trimethacrylate; Pentaerythritol Tetraacrylate; Di-Trimethylolpropane Tetraacrylate; Dipentaerythritol Pentaacrylate; Ethoxylated Pentaerythritol Tetraacrylate; SR 9041, a pentaacrylate Ester commercially available from Sartomer; SR 9008, an Alkoxylated Trifunctional Acrylate Ester commercially available from Sartomer; CD 9009, a trifunctional Methacrylate Ester commercially available from Sartomer; SR 9012, a trifunctional Acrylate Ester commercially available from Sartomer; CD 9050, a Monofunctional Acid Ester commercially available from Sartomer; CD 9051, a Trifunctional Acid Ester commercially available from Sartomer; SR 802, an Alkoxylated Diacrylate commercially available from Sartomer; SR 500 Trifunctional monomer commercially available from Sartomer; SR 515 Trifunctional monomer commercially available from Sartomer; SR 516 Difunctional monomer commercially available from Sartomer; SR 517 Trifunctional monomer commercially available from Sartomer; SR 518 Tetrafunctional monomer commercially available from Sartomer; SR 519 Trifunctional monomer commercially available from Sartomer; SR521 Difunctional monomer commercially available from Sartomer; SR63 3 Metallic Diacrylate commercially available from Sartomer; SR634 Metallic Dimethacrylate commercially available from Sartomer; SR 636 Metallic Diacrylate commercially available from Sartomer; SR 705 Metallic Diacrylate commercially available from Sartomer; SR 708, Metallic Dimethacrylate commercially available from Sartomer; SR 709, metallic Monomethacrylate commercially available from Sartomer; CN 934, Urethane Acrylate commercially available from Sartomer; CN 945, Trifunctional Urethane Acrylate commercially available from Sartomer; CN95 3, Urethane Acrylate commercially available from Sartomer; CN 961, Urethane Acrylate commercially available from Sartomer; CN 962, Urethane Acrylate commercially available from Sartomer; CN 963, Urethane Acrylate commercially available from Sartomer; CN 964, Urethane Acrylate commercially available from Sartomer; CN 965, Urethane Acrylate commercially available from Sartomer; CN 966, Urethane Acrylate commercially available from Sartomer; CN 980, Urethane Acrylate commercially available from Sartomer; CN 198, Urethane Acrylate commercially available from Sartomer; CN 982, Urethane Acrylate commercially available from Sartomer; CN 983, Urethane Acrylate commercially available from Sartomer; CN 984 Urethane Acrylate commercially available from Sartomer; CN 985, Urethane Acrylate commercially available from Sartomer; CN 986, Urethane Acrylate commercially available from Sartomer; CN 970, Urethane Acrylate commercially available from Sartomer; CN 971, Urethane Acrylate commercially available from Sartomer; CN 972, Urethane Acrylate commercially available from Sartomer; CN 973, Urethane Acrylate commercially available from Sartomer; CN 975, Hexafunctional Urethane Acrylate commercially available from Sartomer; CN 977, Urethane Acrylate commercially available from Sartomer; CN 978, Urethane Acrylate commercially available from Sartomer; CN 1 963, Urethane Methacrylate commercially available from Sartomer; CN 104, Epoxy Acrylate commercially available from Sartomer; CN 111, Epoxidized Soy Bean Oil Acrylate commercially available from Sartomer; CN 112, Epoxy Novolak Acrylate commercially available from Sartomer; CN 115, Modified Epoxy Acrylate commercially available from Sartomer; CN 117, Modified Epoxy Acrylate commercially available from Sartomer; CN 118, Acid modified Epoxy Acrylate commercially available from Sartomer; CN120 Epoxy Acrylate commercially available from Sartomer; CN 124, Epoxy Acrylate commercially available from Sartomer; CN 151, Epoxy Methacrylate commercially available from Sartomer; CN 130, Aliphatic Monoacrylate commercially available from Sartomer; CN 131, Aromatic Monoacrylate commercially available from Sartomer; CN 132, Aliphatic Diacrylate commercially available from Sartomer; CN 920, Polyester Acrylate commercially available from Sartomer; CN 704, Acrylated Polyester commercially available from Sartomer; CN 301, Polybutadiene Dimethacrylate commercially available from Sartomer; SB 400,401,402, 500,510, 520, Aromatic Acid Methacrylate commercially available from Sartomer; Ebecryl™ 745, Acrylated Acrylic commercially available from UCB Chemicals; Ebecryl™ 754 Acrylated Acrylic commercially available from UCB Chemicals; Ebecryl™ 1701 Acrylated Acrylic commercially available from UCB Chemicals; Ebecryl™ 1710 AcrylatedAcrylic commercially available from UCB Chemicals; Ebecryl™ 1755 Acrylated Acrylic commercially available from UCB Chemicals; Ebecryl™ 230 Acrylated Urethane commercially available from UCB Chemicals; Ebecryl™ 244, Acrylated Urethane commercially available from UCB Chemicals; Ebecryl™ 264 Acrylated Urethane commercially available from UCB Chemicals; Ebecryl™ 270 Acrylated Urethane commercially available from UCB Chemicals; Ebecryl™ 284 Acrylated Urethane commercially available from UCB Chemicals; Ebecryl™ 1290 Acrylated Urethane commercially available from UCB Chemicals; Ebecryl™ 2001 Acrylated Urethane commercially available from UCB Chemicals; Ebecryl™ 4830 Acrylated Urethane commercially available from UCB Chemicals; Ebecryl™ 4833 Acrylated Urethane commercially available from UCB Chemicals; Ebecryl™ 4835 Acrylated Urethane commercially available from UCB Chemicals; Ebecryl™ 4842 Acrylated Urethane commercially available from UCB Chemicals; Ebecryl™ 4866 Acrylated Urethane commercially available from UCB Chemicals; Ebecryl™ 4883 Acrylated Urethane commercially available from UCB Chemicals; Ebecryl™ 5129 Acrylated Urethane commercially available from UCB Chemicals; Ebecryl™ 8301 Acrylated Urethane commercially available from UCB Chemicals; Ebecryl™ 8402 Acrylated Urethane commercially available from UCB Chemicals; Ebecryl™ 8800 Acrylated Urethane commercially available from UCB Chemicals; Ebecryl™ 8803 Acrylated Urethane commercially available from UCB Chemicals; Ebecryl™ 8804 Acrylated Urethane commercially available from UCB Chemicals; Ebecryl™ 8807 Acrylated Urethane commercially available from UCB Chemicals; Ebecryl™ 3604 Rubber modified Epoxy Acrylate commercially available from UCB Chemicals; Ebecryl™ 3605 Acrylated Bisphenol A Epoxy commercially available from UCB Chemicals; Ebecryl™ 3702 Fatty Acid Modified Epoxy Acrylate commercially available from UCB Chemicals; Ebecryl™ 3703 Amine Modified Bisphenol A Acrylate commercially available from UCB Chemicals; Ebecryl™ 3411 Fatty Acid Modified Epoxy Acrylate commercially available from UCB Chemicals; Ebecryl™ 3600 Amine Modified Bisphenol A Acrylate commercially available from UCB Chemicals; Ebecryl™ 168 Methacylated Acidic Monomer commercially available from UCB Chemicals; Ebecryl™ 170 Acrylated acidic monomer commercially available from UCB Chemicals; Ebecryl™ 350 Acrylated Silicone commercially available from UCB Chemicals; Ebecryl™ 1360 Silcone Hexaacrylate commercially available from UCB Chemicals; Genomer™ 4188 Urethane Acrylate commercially available from Rahn; Genomer™ 4205 Urethane Acrylate commercially available from Rahn; Genomer™ 4215 Urethane Acrylate commercially available from Rahn; Genomer™ 4246 Urethane Acrylate commercially available from Rahn; Genomer™ 4269 Urethane Acrylate commercially available from Rahn; Genomer™ 4297 Urethane Acrylate commercially available from Rahn; Genomer™ 4302 Urethane Acrylate commercially available from Rahn; Genomer™ 4312 Urethane Acrylate commercially available from Rahn; Genomer™ 4316 Urethane Acrylate commercially available from Rahn; Genomer™ 4510 Urethane Acrylate commercially available from Rahn; Genomer™ 4661 Urethane Acrylate commercially available from Rahn; Genomer™ 4205 Urethane Acrylate commercially available from Rahn; Genomer™ 5248 Urethane Acrylate commercially available from Rahn; Genomer™ 5275 Urethane Acrylate commercially available from Rahn; Genomer™ 5695 Urethane Acrylate commercially available from Rahn; Genomer™ 7154 Urethane Acrylate commercially available from Rahn; Photomer® 5018, polyester acrylate commercially available from Photomer Energy Curing Chemicals; Photomer® 5018, polyester acrylate commercially available from Photomer Energy Curing Chemicals; RCC™ 13-429, polyester acrylate commercially available from Photomer Energy Curing Chemicals; RCC™ 13-430, polyester acrylate commercially available from Photomer Energy Curing Chemicals; RCC™ 13-432, polyester acrylate commercially available from Photomer Energy Curing Chemicals; RCC™ 13-433, polyester acrylate commercially available from Photomer Energy Curing Chemicals; Photomer® 6008, Urethane Acrylate commercially available from Photomer Energy Curing Chemicals; Photomer® 6010, Urethane Acrylate commercially available from Photomer Energy Curing Chemicals; Photomer® 6022, Urethane Acrylate commercially available from Photomer Energy Curing Chemicals; Photomer® 6184, Urethane Acrylate commercially available from Photomer Energy Curing Chemicals; Photomer® 6210, Urethane Acrylate commercially available from Photomer Energy Curing Chemicals; Photomer® 6217, Urethane Acrylate commercially available from Photomer Energy Curing Chemicals; Photomer® 6788-20R, Urethane Acrylate commercially available from Photomer Energy Curing Chemicals; Photomer® 6893, Urethane Acrylate commercially available from Photomer Energy Curing Chemicals; RCC™ 12-891, Urethane Acrylate commercially available from Photomer Energy Curing Chemicals; RCC™ 12-892, Urethane Acrylate commercially available from Photomer Energy Curing Chemicals; RCC™ 13-363, Urethane Acrylate commercially available from Photomer Energy Curing Chemicals; Photomer® 6173, Aromatic Acrylate commercially available from Photomer Energy Curing Chemicals; RCC™ 13-424, Polyester Acrylate commercially available from Photomer Energy Curing Chemicals. In an exemplary implementation, the one or more acrylates include polybutadiene dimethacrylate, pentaerythritol tetraacrylate, or the like, or combinations thereof.

The amount of the one or more acrylates present in the adhesion promoter composition can vary widely. The amount of the one or more acrylates present can be at least partially determined by a target or desired viscosity of the adhesion promoter composition. The amount of the one or more acrylates present in the adhesion promoter composition can be from about 1 weight % to about 25 weight %, based on a total weight of the adhesion promoter composition. For example, the amount of the one or more acrylates present in the adhesion promoter composition can be from about 1 weight %, about 5 weight %, or about 10 weight % to about 15 weight %, about 20 weight %, or about 25 weight %, based on a total weight of the adhesion promoter composition. In another example, the amount of the one or more acrylates present in the adhesion promoter composition can be from about 1 weight % to about 25 weight %, about 5 weight % to about 20 weight %, or about 10 weight % to about 15 weight %.

The adhesion promoter composition can include one or more optional functional additives capable of or configured to provide additional functional properties to the adhesion promoter composition. The one or more optional functional additives can be or include, but are not limited to, one or more indicators (e.g., visual indicators), one or more abrasives, one or more plasticizers, one or more surfactants, one or more flame retardant agents, one or more biocides, one or more tackifiers capable of or configured to modify tack of the adhesion promoter composition, one or more cure promoters, one or more accelerants, or the like, or any combination thereof. Examples of optional functional additives referred to herein are discussed further in turn below. The optional functional additives may be combined with the adhesion promoter composition to add one or more functionalities alone or in combination with other additives for further functionalities.

The one or more indicators or visual indicators can be capable of or configured to facilitate, promote, or provide identification of an area or surface treated with the adhesion promoter composition. For example, the visual indicators can be capable of or configured to allow a user to identify what surfaces or areas have been treated by the adhesion promoter composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, disodium, 1-methoxy-2-propanol, 1,2-propanediol, and 2-methoxypropanol, a crimson red solvent based red liquid dye commercially available from KEDA™ Dye of Manitowoc, WI, Triple Glow Powder commercially available from GLONATION of Falmouth, KY, or the like, or combinations thereof.

The one or more indicators can be present in an amount of from about 0.01 weight % to about 5 weight %, based on a total weight of the adhesion promoter composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the adhesion promoter composition. In another example, the one or more indicators can be present in an amount of from about 0.01 weight % to about 5 weight %, about 2 weight % to about 4 weight %, or about 3 weight % to about 3.5 weight %, based on a total weight of the adhesion promoter composition.

The adhesion promoter composition can include one or more abrasives. As used herein, the term "abrasive" can also refer to materials commonly referred to as "polishing agents." The one or more abrasives can be capable of or configured to roughen the surface to facilitate, improve, or otherwise aid adhesion. The one or more abrasives can also be capable of or configured to roughen the surface to facilitate, improve, or otherwise aid adhesion through adhesion promoter chemistry. The one or more abrasives can also be capable of or configured to facilitate, improve, or otherwise aid in the removal of debris and/or residue from the surface.

Illustrative abrasives of the adhesion promoter composition can be or include, but are not limited to, silica, alumina, hydrated alumina, silicates (e.g., zirconium silicate, aluminum silicate including calcined aluminum silicate), talc, sand, glass particles, aluminosilicates, barium sulfate, mica, diatomites, calcium carbonate, calcium sulfate, carbon, wollastonite, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate, magnesium carbonate, or the like, or combinations thereof.

The one or more abrasives can be present in an amount of from about 0.1 weight % to about 10 weight %, based on a total weight of the adhesion promoter composition. For example, the one or more abrasives can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more abrasives can be present in an amount of from about 0.1 weight % to about 10 weight %, about 2 weight % to about 8 weight %, or about 4 weight % to about 6 weight %.

The adhesion promoter composition can include one or more plasticizers. As used herein, the term "plasticizer" can refer to any component, compound, or substance that can facilitate, produce, or promote plasticity and flexibility and/or reduce brittleness. As such, one or more plasticizers can be incorporated to modify (e.g., increase or decrease) plasticity, flexibility, and/or brittleness of the adhesion promoter composition.

The one or more plasticizers can be present in an amount of from about 0.1 weight % to about 10 weight %, based on a total weight of the adhesion promoter composition. For example, the one or more plasticizers can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more plasticizers can be present in an amount of from about 0.1 weight % to about 10 weight %, about 2 weight % to about 8 weight %, or about 4 weight % to about 6 weight %.

The adhesion promoter composition can include one or more surfactants. As used herein, the term "surfactant" can refer to any component, compound, or substance that reduces surface tension in a solution or reduces interfacial tension between two liquids, or between a liquid and a solid. The one or more surfactants can be capable of or configured to facilitate or aid in the cleaning the surface of oil and/or debris. The one or more surfactants can be capable of or configured to better disperse any one or more components, particulates, or elements of the adhesion promoter composition with another one or more components, particulates, or elements of the adhesion promoter composition. In an exemplary implementation, the adhesion promoter composition includes at least one nonionic surfactant.

The one or more surfactants can be or include one or more anionic surfactants, one or more amphoteric surfactants, one or more cationic surfactants, one or more zwitterionic surfactants, one or more nonionic surfactants, or mixtures thereof. Illustrative surfactants of the adhesion promoter composition can be or include, but are not limited to, ionic surfactants and/or nonionic surfactants including octylphenoxy polyethoxy ethanols, such as TRITON™ X-100, X-114, and X-405, commercially available from Union Carbide Co. of Danbury, CT.

The one or more surfactants can be present in an amount of from about 0.1 weight % to about 10 weight %, based on a total weight of the adhesion promoter composition. For example, the one or more surfactants can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more surfactants can be present in an amount of from about 0.1 weight % to about 10 weight %, about 2 weight % to about 8 weight %, or about 4 weight % to about 6 weight %.

The adhesion promoter composition can include one or more flame retardant agents. As used herein, the term "flame retardant agents" can refer to any component, compound, or substance that reduces, slows, or otherwise stops the spread and/or intensity of a fire. The one or more flame retardant agents can be capable of or configured to provide flame retardant properties to the adhesion promoter composition.

Illustrative flame retardant agents of the adhesion promoter composition can be or include, but are not limited to, halogenated species, nitrogen, metals, boron, or phosphorous containing species, or the like, or combinations thereof.

The one or more flame retardant agents can be present in an amount of from about 0.1 weight % to about 10 weight %, based on a total weight of the adhesion promoter composition. For example, the one or more flame retardant agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more flame retardant agents can be present in an amount of from about 0.1 weight % to about 10 weight %, about 2 weight % to about 8 weight %, or about 4 weight % to about 6 weight %.

The adhesion promoter composition can include one or more biocides. As used herein, the term "biocides" can refer to any component, compound, or substance that kills or inhibits the growth of microorganisms such as bacteria, molds, slimes, fungi, or the like, or any combination thereof.

Illustrative biocides of the adhesion promoter composition can be or include, but are not limited to, chlorinated hydrocarbons, organometallics, halogen-releasing compounds, metallic salts, organic sulfur compounds, quaternary ammonium compounds, phenolics, or the like, or combinations thereof.

The one or more biocides can be present in an amount of from about 0.1 weight % to about 10 weight %, based on a total weight of the adhesion promoter composition. For example, the one or more biocides can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more biocides can be present in an amount of from about 0.1 weight % to about 10 weight %, about 2 weight % to about 8 weight %, or about 4 weight % to about 6 weight %.

The adhesion promoter composition can include one or more cure promoters. As used herein, the term "cure promoter" can refer to any component, compound, or substance that facilitates or promotes the curing of the polymeric material, such as polysulfide sealants.

Illustrative cure promoters of the adhesion promoter composition can be or include, but are not limited to, N, N-dimethyl-para-toluidine (DMPT), N-(2-hydroxyethyl)-N-methyl-para-toluidine (MHPT), or combinations thereof. Illustrative cure promoters of the adhesion promoter composition can also include, but are not limited to those cure promoters capable of promoting the cure of sealant material and form a network within the optional gelling agent component during an initial synthesis, such as prior to packaging in a container. For example, the cure promoters can include thiuram, thiuram disulfide, tetrabenzylthiuram disulfide such as WESTCO™ TBzTD, tetramethyl thiuram disulfide, tetraethyl thiuram disulfide, tetramethylthiuram monosulfide, dipentamethylene thiuram tetrasulfate, dipentaethylene thiuramelemental sulfur, or the like, or combinations thereof.

The one or more cure promoters can be present in an amount of from about 0.01 weight % to about 10 weight %, based on a total weight of the adhesion promoter composition. For example, the one or more cure promoters can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more cure promoters can be present in an amount of from about 0.1 weight % to about 10 weight %, about 2 weight % to about 8 weight %, or about 4 weight % to about 6 weight %.

The adhesion promoter composition can include one or more accelerants, initiators, and/or coinitiators. As used herein, the term or expression "accelerants," "initiator," or "coinitiator" can refer to any component, compound, or substance that facilitates or promotes the polymerization and/or cross-linking between the one or more acrylates of the adhesion promoter composition.

The initiators and/or adhesion promoter can be or include, but are not limited to, one or more radical initiators, one or more photoinitiators, or the like, or any combination thereof. Illustrative initiators and/or adhesion promoter can be or include, but are not limited to, one or more azo compounds, such as 4,4'-azobis(4-cyanovaleric acid), 1,1'-azobis(cyclohexanecarbonitrile), azobisisobutyronitrile, 2,2'-azobis(2-methylpropionitrile), or 2,2'-Azobis(2-methylpropionitrile), one or more inorganic peroxides, such as ammonium persulfate, hydroxymethanesulfinic acid monosodium salt dihydrate, potassium persulfate, or sodium persulfate, one or more organic peroxides, such as benzoyl peroxide, t-butyl hydroperoxide, cumene hydroperoxide, dicumyl peroxide, t-butyl peroxide, or the like, or any combination thereof. The illustrative initiators and/or coinitiators can also be or include, but are not limited to, one or more organic photoinitiators, such as one or more acetophenone, one or more benzyl and benozoin compounds, one or more benzophenones, one or more cationic photoinitiators, one or more thioxanthones, camphorquinone, 2-(dimethylamino)ethyl methacrylate, or the like, or any combination thereof.

The one or more initiators and/or coinitiators can be present in an amount of from about 0.1 weight % to about 10 weight %, based on a total weight of the adhesion promoter composition. For example, the one or more initiators and/or coinitiators can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more initiators and/or coinitiators can be present in an amount of from about 0.1 weight % to about 10 weight %, about 2 weight % to about 8 weight %, or about 4 weight % to about 6 weight %.

Exemplary examples of the present disclosure include adhesion promoter compositions having multiple reaction pathways facilitated by the included functional reactive silanes and the organic base composition. For example, an adhesion promoter composition may include a first reactive silane compound, a second reactive silane compound, where the second reactive silane is different from the first, one or more organic solvents, and an organic base. The first reactive silane compound can include an epoxy functional group, a mercapto functional group, an amino functional group, an acrylate functional group, an isocyanate functional group, or a combination thereof, present in an amount of from about 0.1% to about 5.0%, or from about 0.1% to about 2.0% by total weight of the adhesion promoter composition. The second reactive silane compound can include an epoxy functional group, a mercapto functional group, an amino functional group, an acrylate functional group, an isocyanate functional group, or a combination thereof, present in an amount of from about 0.5% to about 20.0% or from about 0.1% to about 10.0% by total weight of the adhesion promoter composition. The organic base can include 1-methylimidazole, pyridine, alkanamine, imidazole, benzimidazole, aniline, quinoline, histidine, guanidine, phosphazene, a hydroxide of an organic cation, or a combination thereof, present in an amount of from about 0.1% to about 5.0% or from about 0.1% to about 2.0% by total weight of the adhesion promoter composition. The adhesion promoter composition does not include a reactive organometallic comprising a reactive titanate, a reactive zirconate, a reactive aluminate, or combinations thereof. The one or more organic solvents can include methyl ethyl ketone (MEK), methyl propyl ketone (MPK), methyl isobutyl ketone (MIBK), acetone, or combinations thereof. An illustrative example of an adhesion promoter includes a first reactive silane compound of glycidoxypropyltrimethoxysilane, a second reactive silane compound that is mercaptopropyltrimethoxysilane, one or more organic solvents including methyl ethyl ketone (MEK), methyl propyl ketone (MPK), methyl isobutyl ketone (MIBK), acetone, or combinations thereof, and an organic base that is 1-methylimidazole. An exemplary adhesion promoter composition as disclosed can provide a mixture of thiols, epoxides, and hydroxides on a substrate surface when applied, and thus the adhesion promoter composition can be designed to react with epoxy polymer systems, polyurethane polymer systems, polysulfide polymer systems, manganese-cured polysulfide polymer systems, polythioether epoxy-cured polymer systems, polythioether polymer systems, polyurea polymer systems, polyacrylate polymer systems, and combinations thereof. An advantage of adhesion promoter compositions of the present disclosure include the use of a single adhesion promoter composition for multiple polymer formulation layers, as compared to requiring a separate adhesion promoter for each individual polymer formulation layer. The substrate may be a carbon fiber composite substrate, a metal or metal alloy substrate, thermoset composite substrate, plastic composite substrate, or a combination thereof. Composite or polymer based substrates can contain fillers, such as mineral fillers, fibers, such as fiberglass, and the like.

Methods

Methods for preparing any one or more of the adhesion promoter compositions disclosed herein are provided. The method can include combining, mixing, blending, or otherwise contacting the one or more organic solvents, the one or more reactive silanes, the one or more reactive organometallics, the optional one or more gelling agents or acrylates, and/or the one or more optional functional additives (e.g., indicators, abrasives, plasticizers, surfactants, flame retardant agents, and/or biocides) with one another to prepare a mixture. It should be appreciated that the order of mixing or contacting each of the components of the adhesion promoter composition can be at least partially determined by the specific components selected. The method can also include purging the mixture with nitrogen to remove dissolved oxygen. The method can further include combining, mixing, blending, or otherwise contacting the mixture with one or more initiators and/or coinitiators. The method can also include forming a network between the one or more gelling agent acrylates. For example, the method can also include polymerizing and/or cross-linking the one or more acrylates of the mixture to prepare the one or more optional gelling agents of the adhesion promoter composition. It should be appreciated that the one or more optional functional additives can be added before and/or after polymerizing and/or cross-linking the one or more acrylates of the mixture. The polymerization and/or cross-linking of the one or more acrylates can be performed at room temperature and/or with added heat. The method can also include exposing the mixture, including a photoinitiator, to predetermined wavelengths of light to promote polymerization and/or cross-linking.

The method can also include subjecting the adhesion promoter composition to viscosity modification. For example, the method can include homogenizing the adhesion promoter composition via shearing and/or dicing in an industrial blender, immersion blender, centrifugal mixer, or the like, or any combination thereof. The adhesion promoter composition can be subjected to viscosity modification for a period of from about 5 seconds (sec), about 10 sec, about 30 sec, or about 1 min to about 2 min, about 3 min, about 5 min, about 10 min, about 30 min, or greater. The method can include adding additional organic solvents to the adhesion promoter prior to homogenizing the adhesion promoter composition. The adhesion promoter composition can be homogenized, for example, in a centrifugal mixer, in the presence of one or more particles. Illustrative particles can be or include, but are not limited to, one or more glass particles, ceramic particles, or the like, or any combination thereof.

The method of applying an adhesion promoter composition may include contacting a first reactive silane compound, for example, glycidoxypropyltrimethoxysilane, a second reactive silane compound, for example, mercaptopropyltrimethoxysilane, and one or more organic solvents including methyl ethyl ketone (MEK), methyl propyl ketone (MPK), methyl isobutyl ketone (MIBK), acetone, or combinations thereof, to prepare a first part of the adhesion promoter composition. The method may further include contacting an organic base with the first part of the adhesion promoter composition, combining the first part of the adhesion promoter composition with the organic base, applying the adhesion promoter composition to a substrate, and applying a polymer formulation layer over the adhesion promoter composition. In certain examples of method of applying an adhesion promoter composition a pause after applying the adhesion promoter composition to the substrate is included to allow the adhesion promoter time to react with the substrate, the organic solvents to evaporate from the adhesion promoter composition, or a combination thereof. Surfaces or substrates may include, but are not limited to, aluminum, titanium, carbon fiber composites, carbon fiber reinforced composites, glass fiber composites, thermoplastics, or combinations thereof. For example, the surface can be a surface of a bridge truss, support column, construction object, building, vehicle, such as an atmospheric vehicle, an aerospace vehicle, an unmanned vehicle, an aircraft, a spacecraft, a satellite, a rocket, a missile, or the like, or any components thereof. In exemplary examples, the polymer formulation layer in the method of applying an adhesion promoter composition may include an epoxy-based polymer formulation, a polyurethane-based polymer formulation, a polysulfide-based polymer formulation, or a combination thereof. In certain examples, a two part adhesion promoter composition can be combined immediately before use and used in its entirety. The adhesion promoter composition can be stored inert, stored at room temperature, stored in a refrigerator, stored in a freezer, or a combination thereof. In certain examples, the adhesion promoter composition can be allowed to come to room temperature prior to mixing or use. In certain aspects, a substrate or surface can be prepared before application of adhesion promoter with an optional degreasing solvent wipe, and can subsequently be applied to a substrate via spray, brush, roller, wipe, wipe on/wipe off, pouring, or a combination thereof.

The method of applying an adhesion promoter composition may include where a shelf life of the adhesion promoter prior to combining the first part of the adhesion promoter composition with the organic base is from about 1 day to about 730 days, or from about 120 days to about 730 days, when stored at or below a temperature of 25° C. The method of applying an adhesion promoter composition may include where a shelf life of the adhesion promoter after combining the first part of the adhesion promoter composition with the organic base is from about 0.5 days to about 14 days, or from about 0.5 days to about 7 days, when stored at or below a temperature of 25° C.

The method can further include separating the one or more particles and/or relatively larger adhesion promoter agglomerations from the adhesion promoter composition after homogenization. For example, the method can include separating the particles and/or relatively larger adhesion promoter agglomerations from the adhesion promoter composition via filtration. Filtration can include passing the adhesion promoter composition including the one or more particles (e.g., glass particles) and/or the relatively larger adhesion promoter agglomerations through a filter having a pore size less than about 1 mm, less than about 0.5 mm, less than about 0.25 mm, or less than about 0.1 mm.

Methods for utilizing any one or more of the adhesion promoter compositions disclosed herein to treat a surface prior to application of a sealant are provided. The surface can be any surface or substrate to be treated with a sealant. Surfaces may include, but are not limited to, aluminum, titanium, carbon fiber composites, carbon fiber reinforced composites, glass fiber composites, thermoplastics, or combinations thereof. For example, the surface can be a surface of a bridge truss, support column, construction object, building, vehicle, such as an atmospheric vehicle, an aerospace vehicle, an unmanned vehicle, an aircraft, a spacecraft, a satellite, a rocket, a missile, or the like, or any components thereof.

The method for utilizing the adhesion promoter composition to treat the surface can include applying or contacting the adhesion promoter composition with the surface. The adhesion promoter composition can be contacted with the surface via a brush, a gauze, a roller, a syringe, an extrusion gun, a spray gun, or the like, or any combination thereof. The adhesion promoter composition can also be applied with the use of a Sempen® Applicator, available from PPG Industries, Inc. Sylmar, California. The adhesion promoter composition can be capable of or configured to eliminate one or more steps in the conventional process or method of preparing a surface for the application of a sealant. For example, in a conventional process of preparing a surface for the application of a sealant, the surface is first treated with a solvent, and subsequently treated with an adhesion promoter. The adhesion promoter composition disclosed herein is capable of or configured to concurrently or simultaneously clean the surface, thereby requiring no mechanical processing of the substrate and effectively eliminating at least one step in the conventional methods of preparing the surface for the application of a sealant.

The method for utilizing the adhesion promoter composition to treat the surface can include an adhesion promoter composition of one part or two parts. The method can further include a one part adhesion promoter composition which is a combination of a solvent, an organometallic, and a silane having a pre-determined shelf life. The method can further include a two part adhesion promoter composition that includes preparation by combining a first part including a solvent with a reactive organometallic with a second part including a solvent with a reactive silane, which has a pre-determined shelf life before and after combining the parts. The method can further include combining a two part adhesion promoter composition immediately prior to use or application.

The method for utilizing the adhesion promoter composition to treat the surface can include evaporating the one or more organic solvents of the adhesion promoter composition. The method can further include activating the one or more reactive silanes or reactive organometallics of the adhesion promoter composition. The method can further include pausing after applying the adhesion promoter composition to the substrate to allow the adhesion promoter time to react with the substrate. The method can further include removing residual solvent or unreacted residue of the adhesion promoter composition from the substrate by physical wiping after activation. The method can also include filling a seal cap with a Class B sealant and disposing the seal cap adjacent the adhesion promoter composition on the surface. The method can further include curing the Class B sealant or applying the adhesion promoter composition to a substrate concurrently with the Class B sealant, a resin, a paint layer, or a paint composition. The method can also include filling a seal cap with a thixotropic sealant and disposing the seal cap after the application of the adhesion promoter composition on the surface. Similarly, the method can also include extruding the thixotropic sealant on the aircraft structure after application of the adhesion promoter composition on the surface.

EXAMPLES

The examples and other implementations described herein are exemplary and not intended to be limiting in describing the full scope of compositions and methods of this disclosure. Equivalent changes, modifications and variations of specific implementations, materials, compositions and methods can be made within the scope of the present disclosure, with substantially similar results.

Example 1

An exemplary adhesion promoter composition (1) was prepared as two components, Part A and Part B. To prepare Part A of the adhesion promoter composition (1), 475 g of a 30:70 by volume blend of MEK:MPK, each commercially available from SIGMA-ALDRICH® of St. Louis, MO, was added to 7.5 g of KEN-REACT® LICA97, commercially available from Kenrich Petrochemicals, Bayonne, NJ, in a 1 liter plastic container and combined with one another. To prepare Part B of the adhesion promoter composition (1), 7.5 g of MPTMS and 35 g of GPTMS, each commercially available from SIGMA-ALDRICH® of St. Louis, MO, were added to a 1 liter plastic container and stirred by hand with a wooden stirrer for 15 seconds. 475 g of a 30:70 by volume blend of MEK:MPK was introduced and the resulting solution was agitated by hand for approximately 30 seconds until homogenous, and sealed under air until use.

Example 2

An exemplary adhesion promoter composition (2) was prepared by mixing a 2 part solution by volume. To prepare the adhesion promoter (2), 5.0 mL of Example 1 Part A was transferred to a 90 mL FlackTek container. 5.0 mL of Example 1 Part B was added dropwise to the FlackTek container including Example 1 Part A using a plastic pipette. The resulting solution was mixed in a FlackTek centrifugal speed mixer for 30 seconds at 1600 rpm. The resulting adhesion promoter solution (2) was stored in a sealed container under air until use.

Example 3

An exemplary adhesion promoter composition (3) was prepared by mixing a 2 part solution by mass. To prepare the adhesion promoter composition (3), 2.47 g of Example 1 Part A was added to a 90 mL FlackTek container. 2.53 g of Example 1 Part B was added dropwise to the FlackTek container including Example 1 Part A using a plastic pipette. The resulting solution was mixed in a FlackTek centrifugal speed mixer for 30 seconds at 1600 rpm. The adhesion promoter solution (3) was stored in a sealed container under air until use.

Application Method

Aluminum substrates were prepared by wiping the surface with acetone and isopropyl alcohol using a lint-free wipe to remove any particulates or residue. The adhesion promoter application area was designated with a tape perimeter.

Liquid deposition: Approximately 2 mL of exemplary adhesion promoter composition (2) or exemplary adhesion promoter composition (3) was transferred onto the surface of the prepared substrate using a plastic pipette. Enough solution was applied to cover the bonding surface completely. The solution was allowed to react under ambient conditions for 15 minutes. The surface was then wiped with a lint-free wipe until no residue or liquid remained. Following wiping, the surface was allowed to dry in air for 15 minutes before sealant application.

Spray coating: Approximately 10 mL of exemplary adhesion promoter composition (2) or exemplary adhesion promoter composition (3) was transferred to a glass container and the container hooked to an Iwata airbrush spray gun. The prepared surface was coated in 1 pass. The coated surface was allowed to react for 30-90 minutes before sealant application. After the reaction time, a dry, orange residue was visible on the surface of the substrate.

Sealant application: Approximately 3 mil of sealant is deposited onto the surface(s) using casting, spreading, squeezing out, extruding, or similar methods onto a desired substrate. Any excess material can be removed with a doctor blade if a certain thickness is desired. The sealant is allowed to cure from 4-48 hours at room temperature, depending on the manufacturer instructions. The surface of the sealant is then scraped 10 times with a silicone pen to evaluate adhesion of sealant to the substrate using the applied adhesion promoter composition (2) and adhesion promoter composition (3). Both preparations of sealant using adhesion promoter composition (2) and adhesion promoter composition (3) demonstrated sufficient adhesion of sealant to the substrate.

Example 4 (SM1)

An exemplary adhesion promoter composition was prepared by mixing a 2-part solution by mass. To prepare the adhesion promoter composition, a 30/70 blend of MEK/MPK was made. 0.75% of mercaptopropyl)trimethoxysilane (MPTMS) by weight of the adhesion promoter, obtained from Signa Aldrich, was added to a glass container. 3.75% of (3-glycidyloxypropyl)trimethoxysilane (GPTMS) by weight of the adhesion promoter, obtained from Sigma Aldrich, was added dropwise to the glass container. The composition was swirled by hand for approximately 30 seconds. The 30/70 blend of MEK/MPK was added dropwise to the glass container and the composition was swirled by hand for approximately 30 seconds. A second part containing 1-methylimidazole, 0.75% by weight of the adhesion promoter composition, was made. Both parts were stored under an inert gas in a cool, dry, dark location until use. Prior to application, 1-methylimidadzole, obtained from Sigma Aldrich, was added dropwise and vortex mixed for approximately 10 seconds. No gelation, precipitation, or evidence of reaction of either solution was noted prior to application.

Example 5 (SM2)

An exemplary adhesion promoter composition was prepared by mixing a 2-part solution by mass. To prepare the adhesion promoter composition, a 30/70 blend of MEK/MPK was made. 1.5% of mercaptopropyl)trimethoxysilane (MPTMS) by weight of the adhesion promoter, obtained from Sigma Aldrich, was added to a glass container. 7.0% of (3-glycidyloxypropyl)trimethoxysilane (GPTMS) by weight of the adhesion promoter, obtained from Sigma Aldrich, was added dropwise to the glass container. The composition was swirled by hand for approximately 30 seconds. The 30/70 blend of MEK/MPK was added dropwise to the glass container and the composition was swirled by hand for approximately 30 seconds. A second part containing 1-methylimidazole, 1.5% by weight of the adhesion promoter composition was made. Both parts were stored under an inert gas in a cool, dry, dark location until use. Prior to application, 1-methylimidadzole, obtained from Sigma Aldrich, was added dropwise and vortex mixed for approximately 10 seconds. No gelation, precipitation, or evidence of reaction of either solution was noted prior to application.

Preparation and Application Methods

CFRP or aluminum substrates were prepared by wiping the surface with acetone and isopropyl alcohol using a lint-free wipe to remove any particulates or residue. The adhesion promoter application area was designated with a tape perimeter.

Liquid deposition: The 2-part adhesion promoter composition of either Example 4 or Example 5 was combined and allowed to activate for approximately 15 minutes. Approximately 2 mL of either Example 4 or Example 5 was transferred onto the surface of the prepared substrate using a plastic pipette. Enough solution was applied to cover the bonding surface completely. The solution was allowed to react under ambient conditions for 15 minutes. The surface was then wiped with a lint-free wipe until no residue or liquid remained. Following wiping, the surface was allowed to dry in air for 15 minutes before applying polysulfide sealant or epoxy primer.

Spray deposition: The 2-part adhesion promoter composition of either Example 4 or Example 5 was combined and allowed to activate for approximately 15 minutes. The adhesion promoter composition was added to a spray gun, such as an Iwata airbrush spray gun, or a Devilbiss high volume low pressure (HVLP) spray gun positioned ~4" to 6" from the surface, waiting 30 seconds between passes. The prepared surface was coated in 1 pass (aluminum, CFRP tool-side) or 2 passes (CFRP bag-side). The coated surface was allowed to react for 1 to 8 hours (aluminum, CFRP tool-side) or 1 to 4 hours (CFRP bag-side) before applying polysulfide sealant or epoxy primer. The dried panels show a small amount of transparent residue.

Wipe on/wipe off deposition: The 2-part adhesion promoter composition of either Example 4 or Example 5 was combined and allowed to activate for approximately 15 minutes. The adhesion promoter composition is inverted onto a lint-free cloth 2-3 times so as to soak the cloth with the adhesion promoter composition then vigorously wipe the surface of the substrate with the soaked cloth for about 15 seconds. The wiped panels are allowed to air dry for 30 minutes to 1 hour before applying polysulfide sealant or epoxy primer.

Sealant application: Approximately 3 mil of sealant is deposited onto the surface(s) using casting, spreading, squeezing out, extruding, or similar methods onto a desired substrate. Any excess material can be removed with a doctor blade if a certain thickness is desired. The sealant is allowed to cure from 4-48 hours at room temperature, depending on the manufacturer instructions. The surface of the sealant is then scraped 10 times with a silicone pen to evaluate adhesion of sealant to the substrate using the applied adhesion promoter composition (4) and adhesion promoter composition (5). Both preparations of sealant using adhesion promoter composition (4) and adhesion promoter composition (5) demonstrated sufficient adhesion of sealant to the substrate.

No gelation, precipitation, or evidence of reaction of either solution was noted after mixing or during application. Application of adhesion promoter compositions described in Examples 4 and 5 provided adequate adhesion.

The following description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids, or liquids as appropriate. The amounts given are based on the active weight of the material. Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An adhesion promoter composition, comprising:
   a first reactive silane compound;
   a second reactive silane compound, wherein the second reactive silane compound is different from the first reactive silane compound;
   one or more organic solvents; and
   an organic base; and wherein:
      the first reactive silane compound is present in an amount of from about 0.1% to about 2.0% by total weight of the adhesion promoter composition; and
      the second reactive silane compound is present in an amount of from about 0.1% to about 10.0% by total weight of the adhesion promoter composition;
      the organic base comprises phosphazene or 1-methyl-imidazole and is present in an amount of from about 0.75% to about 1.5% by total weight of the adhesion promoter composition; and
      the adhesion promoter composition is substantially free of photoinitiators and is substantially free of reactive titanate, reactive zirconate, or reactive aluminates.

2. The adhesion promoter composition of claim 1, wherein the first reactive silane compound comprises an epoxy functional group, a mercapto functional group, an amino functional group, an acrylate functional group, an isocyanate functional group, or a combination thereof.

3. The adhesion promoter composition of claim 2, wherein the first reactive silane compound comprises glycidoxypropyltrimethoxysilane.

4. The adhesion promoter composition of claim 1, wherein the second reactive silane compound comprises mercaptopropyltrimethoxysilane.

5. The adhesion promoter composition of claim 1, wherein the organic base further comprises histidine, pyridine, alkanamine, aniline, benzimidazole, quinoline, or a combination thereof.

6. The adhesion promoter composition of claim 1, wherein the organic base further comprises imidazole.

7. The adhesion promoter composition of claim 1, wherein:

the first reactive silane compound comprises glycidoxy-propyltrimethoxy silane;

the second reactive silane compound comprises mercap-topropyltrimethoxysilane; and the one or more organic solvents comprises methyl ethyl ketone (MEK), methyl propyl ketone (MPK), methyl isobutyl ketone (MIBK), acetone, or combinations thereof.

8. The adhesion promoter composition of claim 1, wherein the organic base comprises phosphazene.

9. The adhesion promoter composition of claim 1, wherein the first reactive silane compound comprises a mercapto functional group.

10. An adhesion promoter composition, comprising:
   a first reactive silane compound comprising an epoxy functional group, a mercapto functional group, an amino functional group, an acrylate functional group, an isocyanate functional group, or a combination thereof;
   a second reactive silane compound comprising an epoxy functional group, a mercapto functional group, an amino functional group, an acrylate functional group, an isocyanate functional group, or a combination thereof; and
   wherein the second reactive silane is different from the first;
   one or more organic solvents; and
   an organic base; and wherein:
      the first reactive silane compound is present in an amount of from about 0.1% to about 2.0% by total weight of the adhesion promoter composition;
      the second reactive silane compound is present in an amount of from about 0.1% to about 10.0% by total weight of the adhesion promoter composition;
      the organic base comprises phosphazene or 1-methyl-imidazole and is present in an amount of from about 0.75% to about 1.5% by total weight of the adhesion promoter composition; and
      the adhesion promoter composition is substantially free of photoinitiators and is substantially free of reactive titanate, reactive zirconate, or reactive aluminates.

11. The adhesion promoter composition of claim 10, wherein the first reactive silane compound comprises gly-cidoxypropyltrimethoxysilane.

12. The adhesion promoter composition of claim 10, wherein the second reactive silane compound comprises mercaptopropyltrimethoxysilane.

13. The adhesion promoter composition of claim 10, wherein:
   the first reactive silane compound comprises glycidoxy-propyltrimethoxysilane;
   the second reactive silane compound comprises mercap-topropyltrimethoxysilane;
   the one or more organic solvents comprises methyl ethyl ketone (MEK), methyl propyl ketone (MPK), methyl isobutyl ketone (MIBK), acetone, or combinations thereof; and
   the organic base further comprises aniline.

14. A method for applying an adhesion promoter compo-sition, comprising:
   contacting a first reactive silane compound comprising glycidoxypropyltrimethoxysilane, a second reactive silane compound comprising mercaptopropylt-rimethoxysilane, and one or more organic solvents comprising methyl ethyl ketone (MEK), methyl propyl ketone (MPK), methyl isobutyl ketone (MIBK), acetone, or combinations thereof, to prepare a first part of the adhesion promoter composition;
   contacting an organic base with the first part of the adhesion promoter composition;
   combining the first part of the adhesion promoter com-position with the organic base;
   applying the adhesion promoter composition to a sub-strate; and
   applying a polymer formulation layer over the adhesion promoter composition; and wherein:
      the first reactive silane compound is present in an amount of from about 0.1% to about 2.0% by total weight of the adhesion promoter composition; and
      the second reactive silane compound is present in an amount of from about 0.1% to about 10.0% by total weight of the adhesion promoter composition;
      the organic base comprises phosphazene or 1-methyl-imidazole and is present in an amount of from about 0.75% to about 1.5% by total weight of the adhesion promoter composition; and
      the adhesion promoter composition is substantially free of photoinitiators and is substantially free of reactive titanate, reactive zirconate, or reactive aluminates.

15. The method of claim 14, further comprising pausing after applying the adhesion promoter composition to the substrate to allow the adhesion promoter time to react with the substrate, the organic solvents to evaporate from the adhesion promoter composition, or a combination thereof.

16. The method of claim 14, wherein the substrate is a carbon fiber composite substrate.

17. The method of claim 14, wherein the polymer formu-lation layer comprises an epoxy-based polymer formulation, a polyurethane-based polymer formulation, a polysulfide-based polymer formulation, or a combination thereof.

18. The method of claim 14, further comprising no mechanical processing of the substrate.

19. The method of claim 14, wherein a shelf life of the first part of the adhesion promoter composition prior to combining the first part of the adhesion promoter composi-tion with the organic base is from about 1 day to about 730 days when stored at or below a temperature of 25° C.

20. The method of claim 14, wherein a shelf life of the adhesion promoter composition after combining the first part of the adhesion promoter composition with the organic base is from about 0.5 days to about 14 days when stored at or below a temperature of 25° C.

* * * * *